Jan. 18, 1927.
J. W. MATTHEWS
GATE
Filed Oct. 26, 1925

1,615,095

WITNESSES
INVENTOR
J. W. Matthews
BY
ATTORNEYS

Patented Jan. 18, 1927.

1,615,095

UNITED STATES PATENT OFFICE.

JOSEPH WILLIAM MATTHEWS, OF MENARD, TEXAS.

GATE.

Application filed October 26, 1925. Serial No. 64,867.

The gate of the present invention is primarily intended for permitting the free passage of automotive vehicles and pedestrians, and at the same time preventing the passage of cattle.

An object of the invention is to provide a gate of this character which may be operated by a bumper of a vehicle to open the same, which will be gravitationally self-closing, and which may be economically constructed.

A further object of the invention is to provide a gate of simple and practical construction, sufficiently rugged and durable to withstand the rough usage to which it will be subjected, and a gate which, while readily operable by the impact of a motor vehicle, will oppose enough resistance to wind pressure to obviate the danger of being blown open.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein Fig. 1 is a perspective view of a gate embodying the invention.

Figure 1:
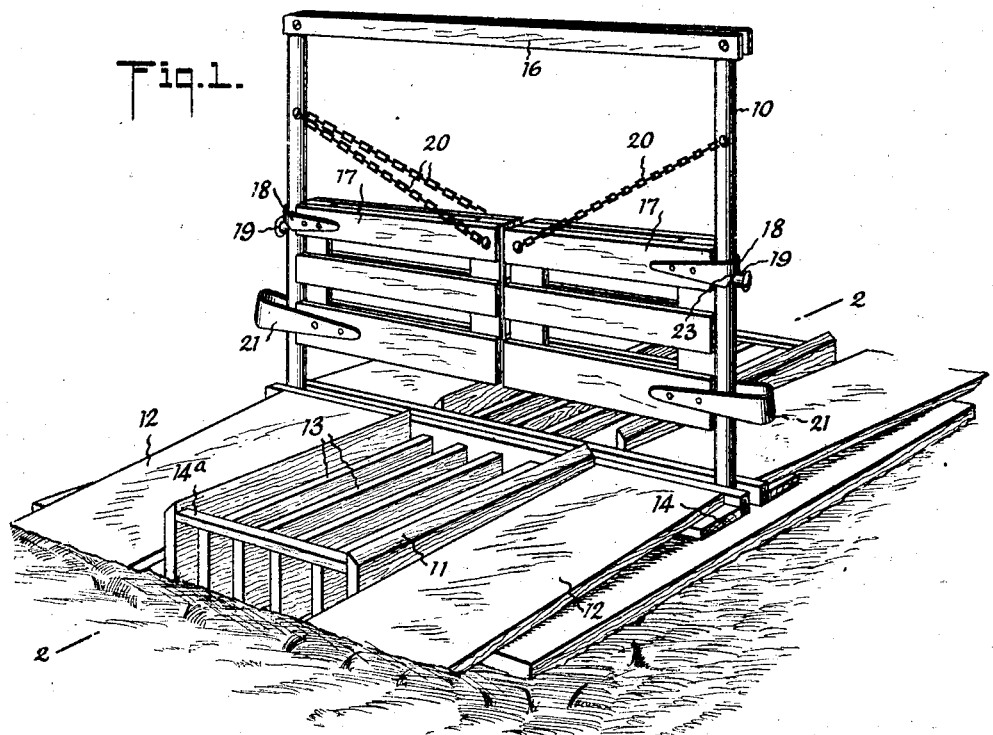
Figure 2:
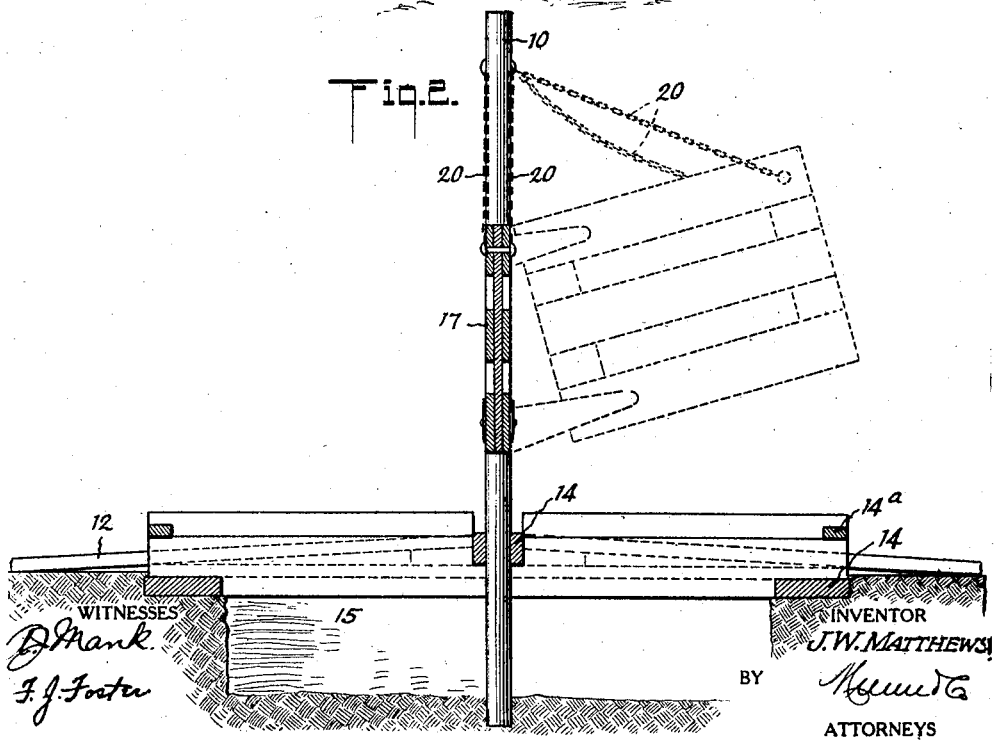

Fig. 2 is a transverse sectional view on the line 2—2 of Fig. 1, the open position of one of the gate sections being indicated in dotted lines.

The gate posts 10 are driven into the ground between a pair of platform sections, each of which includes a central skeleton portion 11 and outer inclined runways 12 to accommodate the wheels of a motor car. The central section 11 may be formed in various ways, but preferably includes a series of spaced planks 13 connected by cross bars 14 and arranged on edge in spaced relationship parallel to the direction of a passageway through the gate. Preferably a pit 15 is provided under the platform, so that cattle will not attempt to walk over the section 11. The inclined runway sections 12 are relatively narrow and there is consequently insufficient room for the passage of cattle over the runway, although ample passageway for pedestrians.

The upper cross bars 14ª at the entrance ends of section 11, and the fact that the outer planks 13 are elevated well above the roadway, eliminates the chance of catching a vehicle wheel between the planking. Outer planks 13 and cross bars 14ª act as guard rails, so that it would be difficult for even a careless driver to become caught in the planking.

The gate posts may be connected at their upper end by a strengthening cross bar 16. A pair of swinging gate sections 17 preferably of substantial transverse width are hinged to the posts, so that they will swing open under the impact of an automobile fender. Each gate section at its upper end carries a U shaped hinged member 18 straddling the gate post, and resting on an upwardly projecting stud 19. The free ends of the gate section are suspended from the gate posts by chains or other flexible devices 20. A pair of chains is used to support each section. Said chains connect opposite faces of the top corners of the gate sections to the gate posts, so that swinging movement of the gate sections in either direction will cause one of the chains to slack, and the other chain to tighten, whereby the free edges of the sections will be lifted upwardly as indicated in dotted lines in Fig. 2. The gate sections are supported on the hinges 18 and the chains 20, but supplemental guiding U brackets 21 at the lower outer corners of the gate, straddle the gate posts and guide the swinging movement of the gate sections. It will be noted that these brackets extend beyond the posts a sufficient distance to provide ample clearance for the upward movement of the sections.

The hinges 18 are notched as indicated at 23, so that a camming action is had with the studs 19. By virtue of this construction, movement of the gate sections toward open position under the influence of the wind is prevented, inasmuch as practically the entire weight of the gate opposes such movement.

Operation of the device is as follows: An automobile coming up the runway strikes the gate sections and swings them open. As the sections swing to open position, one chain 20 of each section will slack, and the weight of the gate will be supported on the other chain. Inasmuch as the length of chain is a constant factor, the free edges of the gate sections will tilt upwardly as indicated in Fig. 2, and the hinged edges of the gate sections will be slightly elevated due to the camming notch 23 on each hinge 18 riding over its associated stud 19. When the gate has been swung to wide open position, the guide members 21 act as stops to limit further swinging movement. When the vehicle has passed through, the weight of the gate sections will tend to restore them to their normal positions. The gate sections are thus gravitationally self-closing. When they reach home position, the engagement of the camming notches 23 over the pins 19, effectively checks them against further swinging.

From the foregoing description it will be seen that I have provided a bumper operated gate mechanism which is automatically self-closing, which cannot be readily blown open, which permits the free passage of pedestrians and automobiles, and effectively prevents the passage of cattle.

While the embodiment of the invention illustrated is a preferred one, it will be evident that various changes and alterations might be made in the general form and arrangement of parts described, without departing from the invention. Hence I do not wish to limit myself to the details set forth, but shall consider myself at liberty to make such changes and alterations as fairly fall within the spirit and scope of the appended claims.

I claim:

1. The combination with a gate including a pair of bumper operated swinging gate sections, of approaches on each side of the gate including central skeleton timbered portions to deter the passage of cattle and inclined runways at the sides of said portions to accommodate the wheels of a motor vehicle, said skeleton portions including guard rails raised above the runways to prevent the wheels of a motor vehicle from entering said portions.

2. A swinging gate including a gate post, a hinge member on the gate embracing the post and a stud on the post supporting the hinge member, a pair of flexible devices connected to the post at a point above the hinge and supporting the free upper corner of the gate, whereby the gate is lifted as it swings open and is adapted for gravitational closing, said hinge member having a cam slot therein coacting with the stud to oppose opening of the gate under the influence of the wind.

3. A swinging gate including a gate post, a hinge member on the gate embracing the post and a stud on the post supporting the hinge member, a pair of flexible devices connected to the post at a point above the hinge and supporting the free upper corner of the gate, whereby the gate is lifted as it swings open and is adapted for gravitational closing, said gate including a guiding member near the lower corner of its hinged edge straddling the post and providing clearance for the lifting and swinging movement of the gate.

JOSEPH WILLIAM MATTHEWS.